United States Patent [19]

Hoornweg

[11] Patent Number: 4,755,072
[45] Date of Patent: Jul. 5, 1988

[54] REMOVABLE, TRANSPARENT, COLORED KEY CAPS FOR COLOR CODING A KEYBOARD

[76] Inventor: Andries P. Hoornweg, 115 Carberry Crescent, Brampton Ontario, Canada, L6V 2G2

[21] Appl. No.: 919,171

[22] Filed: Oct. 15, 1986

[51] Int. Cl.$^4$ .............................................. B41J 5/12
[52] U.S. Cl. ..................................... 400/490; 400/495
[58] Field of Search ...................... 400/490, 495, 487

[56] References Cited

FOREIGN PATENT DOCUMENTS

| | | | |
|---|---|---|---|
| 72606 | 8/1901 | Canada | 235/96 |
| 394711 | 2/1911 | Canada | 235/96 |
| 219709 | 6/1922 | Canada | 235/96 |
| 233004 | 7/1923 | Canada | 235/96 |
| 266211 | 11/1926 | Canada | 35/62 |
| 573854 | 4/1959 | Canada | 235/96 |
| 665146 | 6/1963 | Canada | 197/10 |
| 2222693 | 10/1974 | France | 400/490 |
| 369303 | 3/1932 | United Kingdom | 400/490 |

OTHER PUBLICATIONS

I.B.M. Technical Disclosure Bulletin, vol. 28, No. 2, Jul. 1985, "Ergonomic Keyboard Design . . . ".

*Primary Examiner*—Edgar S. Burr
*Assistant Examiner*—Tonya Lamb
*Attorney, Agent, or Firm*—Beveridge, DeGrandi & Weilacher

[57] ABSTRACT

A flexible cup-shaped keyboard cap formed from transparent colored plastic enables a subset of keys to be distinguished by color while maintaining visibility of the key designation.

2 Claims, 1 Drawing Sheet

U.S. Patent  Jul. 5, 1988  4,755,072
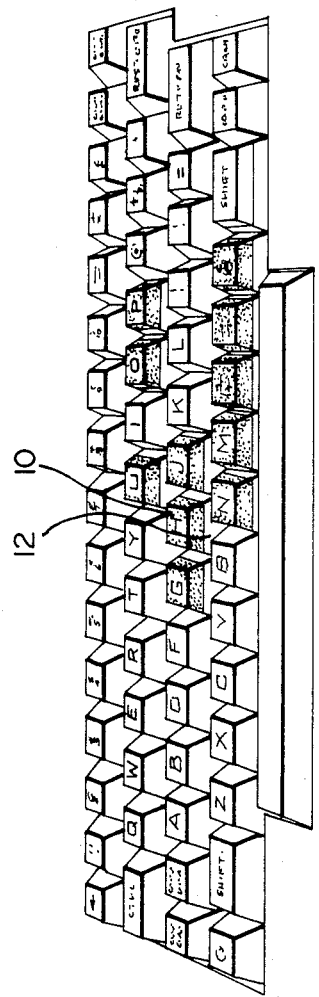
FIG. 1
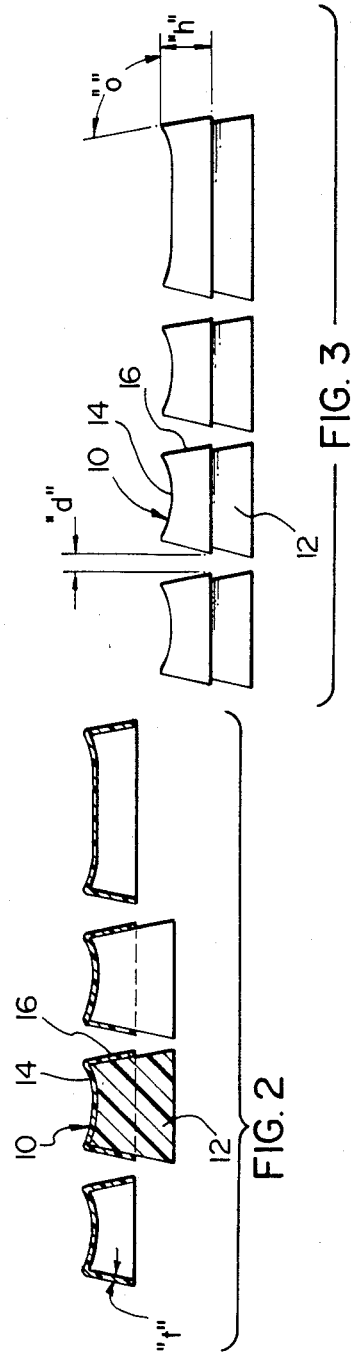
FIG. 2
FIG. 3

REMOVABLE, TRANSPARENT, COLORED KEY CAPS FOR COLOR CODING A KEYBOARD

This invention relates to key caps which fit onto electronic typewriters, word-processor and computer keyboard keys.

It is known to attach plastic or rubber caps to keyboard keys in order to alter the key designation, to protect the key or to provide a shock absorbing, sound deadening, or anti-finger slipping means. As well, caps or discs which mask the key designation or are distinguished by texture have been employed to teach touch-typing.

The present invention relates to the use of colored caps formed from transparent colored material which maintain the key designation while distinguising a particular subset of keys on the basis of color. In view of the increasing use of keyboards, particularly computer keyboards, for narrowly defined functions, by persons who are not trained to type, the combination of color, to distinguish the key(s) relevant to the particular task, and transparency to allow visibility of the key designation to be maintained, is particularly useful from the standpoint of improved efficiency in computer keyboard operation, a cap combining such features allows for program specific accentuation of the most frequently used function keys and ease of association between color and function. The caps, may be formed from flexible plastic, and are designed to fit snugly onto the keys, but are removable and can be replaced on any subset of keys.

The appropriate thickness of the cap material is chosen to provide optimal strength while maintaining a sufficient spacing between the caps to preclude contact between adjacent keys.

In a "form fitted" cap design, the cap will be cup-shaped and sufficient fixation to the key may be achieved through friction forces or a combination of such forces and a vacuum effect. The vacuum effect can be enhanced, if necessary, by wetting the inner surface of the cap to assist in expelling air trapped in between the cap and key.

The invention will now be described with reference to the embodiments illustrated in the drawings. It is to be understood that the device is not limited to the specific construction or shape shown but may embody various changes within the scope of the invention.

FIG. 1 shows a keyboard fitted with the device of this invention;

FIG. 2 is a cross-sectional view of several caps, some with associated keys, illustrating their cup-shaped appearance; and FIG. 3 shows keys fitted with the device of this invention in functional relation to each other, illustrating a spacing between them.

As shown in FIG. 1 several key caps 10 are fitted onto the keys 12.

In FIG. 2 the top wall portion 14 of the cap 10 is shown in relation to the sidewall portion 16 and the cap is shown to take the shape of a key with a typically indented top. The thickness "t" of the cap is also shown. A thickness "t" equal to or exceeding 1.0 mm is preferred.

The spacing between two adjacent caps "d" is particularly shown in FIG. 3. A distance "d" equal to or exceeding 1.0 mm is preferred. The spacing between the caps is shown to be a function of the spacing between the keys, the degree to which the sidewall portion extends downward into the narrowing space between the keys, as well as the thickness of the cap. Owing to the tapering shape of most computer and word-processor keys an appropriate range for the height of the sidewall "h" will be selected as a function of the angle "o" between the sidewall and top wall portions of the cap. Where the angle "o" exceeds 105° a height "h" equal to or exceeding 8.0 mm is preferred. After the spacing between the caps is duly accounted for, a particular height is selected which maximizes the surface contact between the sidewall of the cap and the corresponding portion of the key while maintaining a suitably thick sidewall construction.

I claim:

1. A removable key cap comprising a single cup-shaped piece of transparent colored plastic having a top wall portion completely surrounded by an outwardly flared sidewall portion, said cap being suitable for fitting snugly over a keyboard key with said top wall portion contacting the top of the key and said sidewall portion extending part way down an outwardly flared side of the key so as to provide a frictional retentive force; said frictional retentive force being sufficient to retain the cap on the key in normal use while allowing removal as required; said top wall portion being without insignia but allowing any insignia of the underlying key to show through.

2. The key cap of claim 1 in which the top wall portion is concave, whereby it can intimately contact the top of a concave key.

* * * * *